Patented Sept. 26, 1939

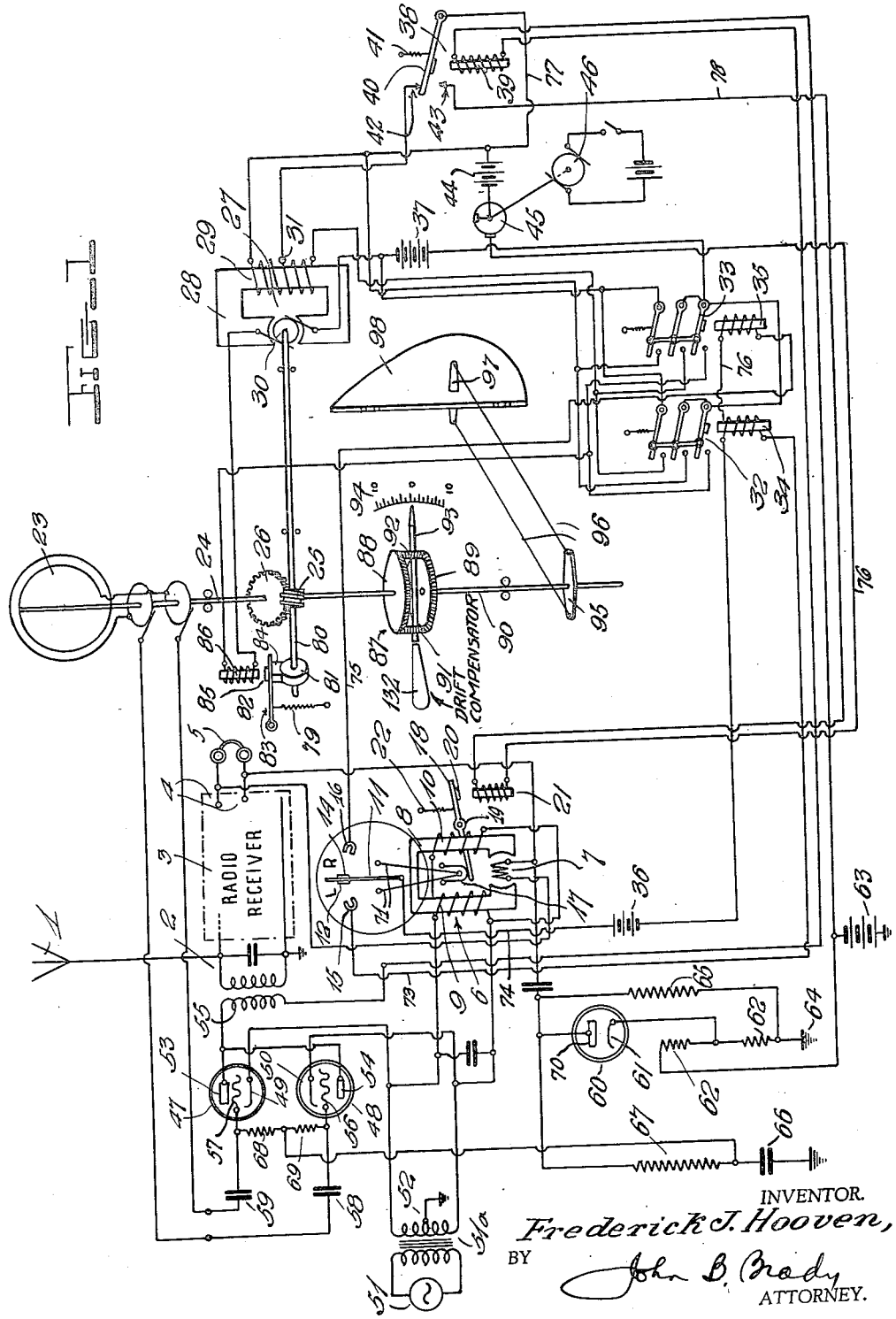

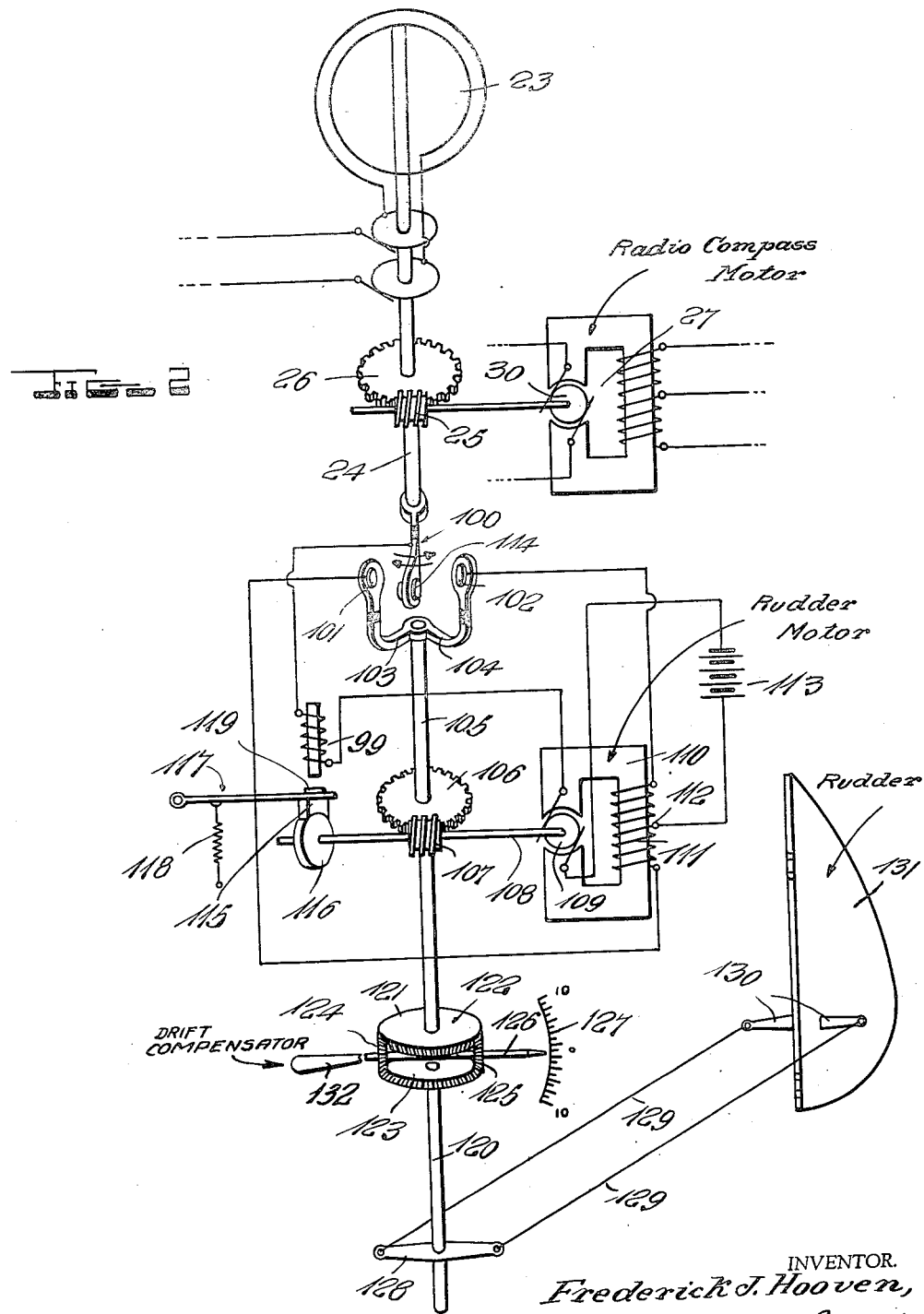

2,173,841

UNITED STATES PATENT OFFICE 2,173,841

RADIO CONTROLLED AIRCRAFT SYSTEM

Frederick J. Hooven, Dayton, Ohio

Application July 17, 1936, Serial No. 91,191

7 Claims. (Cl. 172—282)

My invention relates broadly to radio controlled systems for aircraft and more particularly to a circuit arrangement or mechanical structure for automatically maintaining an aircraft on a predetermined course of flight.

One of the objects of my invention is to provide a circuit arrangement for automatically controlling the course of aircraft in flight between two or more prearranged positions with means for automatically restoring the aircraft to the proper course in the event of any tendency of departure from such prearranged course.

Another object of my invention is to provide a radio controlled system for aircraft having means for operating the rudder of an aircraft for maintaining the aircraft on a predetermined course with means for eliminating the effects of hunting and lost motion which may tend to arise during the functioning of the control mechanism.

Still another object of my invention is to provide an arrangement of control mechanism for guiding aircraft according to a directively propagated beam having means for correspondingly controlling the position of the aircraft rudder whereby the rudder may be maintained in a position which will set the course for the aircraft according to the directively propagated beam and will be automatically adjusted to maintain the aircraft on the predetermined course irrespective of conditions tending to deviate the aircraft from the course.

A further object of my invention is to provide a circuit arrangement for a precision control mechanism for guiding aircraft according to a directively propagated beam of radio frequency energy having means for controlling the angular position of the rudder of the aircraft in differential relation to the deviation of the aircraft from the prearranged course.

A still further object of my invention is to provide a precision control mechanism for aircraft having means for angularly shifting the rudder of the aircraft with substantially greater angular velocity when the aircraft deviates or tends to deviate a relatively great distance from a prearranged course as compared to a control of the rudder at smaller angular velocity when the aircraft departs a relatively short distance from the prearranged course.

Still another object of my invention is to provide an arrangement of radio control precision apparatus for operating a servo-motor which, in turn, controls the angular movement of the rudder of an aircraft under control of energy received from a directively propagated radio frequency beam.

Other and further objects of my invention reside in the multiple speed control system for operating the rudder of an aircraft as set forth more fully in the specification hereinafter following by reference to the accompanying drawings, in which:

Figure 1 diagrammatically and schematically shows the circuit arrangement of my invention and the means employed for operating the aircraft rudder from the same motor which orients the radio compass loop; and Fig. 2 illustrates the manner in which the system of my invention controls a servo-motor which, in turn, controls the air-rudder of the aircraft for maintaining the aircraft on a prearranged course determined by the directively propagated radio frequency beam.

My invention is directed to a system for automatically guiding an aircraft for maintaining the aircraft along a prearranged course of flight determined by a directively propagated radio frequency beam. Accidents due to the failure of pilots to properly follow the directively propagated beam may be avoided in the system of my invention by eliminating the human element which may introduce sources of error in the reading of indicators or in observing received beam signals. In addition to visual and aural signal observing means, I provide an automatic control for directly maintaining the rudder of the aircraft on the course defined by the directively propagated beam. Under changes in wind conditions, the tendencies which exist for deviating an aircraft from the predetermined course produce no detrimental effect in the system of my invention. The automatic orienting means tending to maintain the radio compass loop in a predetermined plane with reference to the line of bearing of the beam or transmitting station toward which the aircraft is directed controls the angular position of the rudder on the aircraft. I may employ the same motor which orients the radio compass loop for controlling the movement of the rudder or I may control the operation of a servo-motor in accordance with the movement of a radio compass loop which, in turn, controls the movement of the rudder. When the loop is off-course with respect to a line of direction from the loop to the distant radio transmitter, the orientation means operates relatively quickly. When the plane of the loop is moved into a position on-course with respect to the transmitter, the driving means operates more slowly. This variable speed arrangement insures a quick and accurate response of the receiving apparatus to the signals of the transmitter. That is, the orientation is effected at greater speed when the loop is off-course with respect to the line of bearing to the distant transmitter than when the loop is closer to the on-course relation to the line of bearing between the loop and the transmitter.

The radio compass loop on the aircraft drives a drift indicator which informs the pilot with respect to the functioning of the automatic control system. A brake is employed for insuring the setting and maintaining of the rudder in the angular plane determined by the position of the radio compass loop which brake is functioned simultaneously with the deenergization of the driving motor circuit. In certain installations, I provide a servo-motor which directly controls the rudder of the aircraft and in which the servo-motor is controlled in accordance with the orientation of the loop which is maintained in predetermined position according to the position of the aircraft with respect to the directively propagated beam.

Referring to the drawings in detail, Figure 1 shows the apparatus carried by the aircraft for maintaining the aircraft on the course defined by the directively propagated beam. Reference character 1 designates the non-directional antenna connected to input system 2 of the radio compass receiver 3 on the aircraft. The receiver is connected to ground as indicated. The output of the receiver has been indicated connected to terminals 4 and as connected to both the aural receiving device, such as telephones 5, and also relay device 6. The relay device 6 comprises armature winding 7 angularly movable within the electromagnetic structure 8 having control windings 9 and 10. The angularly shiftable arm 11 is moved under control of the armature winding 7 and carries opposite contact members 12 and 14 adapted to make contact respectively with fixed contacts 15 and 16. The fixed contacts 15 and 16 may comprise magnetic elements coacting with contacts 12 and 14 formed from magnetic material so that the arm 11 when shifted to either of the limiting positions thereof remains in the shifted position. By reason of the stick magnetic characteristic of the device, I provide special means for restoring the arm 11 to central position. Restoring means comprises a yoke-shaped member 17 carried by pivoted arm 18 pivoted at 19. The pivoted arm 18 has an armature 20 thereon which may be operatively controlled by means of electromagnet 21 against the action of spring means 22.

The operation of the restoring mechanism will be clearer after a consideration of the loop actuating mechanism. The coil antenna or loop or directional antenna 23 is mounted on an angularly shiftable or rotatable shaft 24 which is suitably geared to a driving motor system. For purposes of explaining my invention, I have shown the loop orienting mechanism schematically as comprising a worm gear 25 for driving gear 26 connected with rotary shaft 24, but it will be understood that various forms of driving mechanism may be provided. The driving motor 27 comprises field magnet system 28, field winding 29 and the rotary armature 30. The field winding 29 is tapped at 31 as indicated. In order to control the direction of rotation of the driving motor 27, I provide automatic reversing switches 32 and 33, which are individually controlled by electromagnetic systems 34 and 35 dependent upon the movement of arm 11 to the left or right, respectively. That is to say, the arm 11 in moving to the left establishes a connection between movable contact 12 and fixed contact 15, thereby completing a circuit through conductor 7 through electromagnetic actuating device 34 thus energizing electromagnetic actuating device 34 from potential source 36 through the circuit completed through conductor 74 returning to arm 11 as shown. In the event that arm 11 shifts to the right, a connection is established between movable contact 14 and fixed contact 16 through conductor 75 which leads to electromagnetic actuating device 35 and through conductor 76 to potential source 36 returning to arm 11 through conductor 74. The source of potential 37 for driving motor 27 is reversed with respect to the armature winding 30 under control of the reversing switches 32 and 33 for determining the direction of rotation of the driving gear 25.

The arm members 71 are pivoted at a common point which is the intersection of the V structure shown within the arms of the yoke shaped member 17. When yoke shaped member 17 moves upward under the influence of electromagnet 21, which is periodically energized by rotary switch 45, the ends of the arm members 71 are squeezed together thus restoring the contact arm 11 to its central position. The means for causing the arms to become operative only when the radio compass loop approaches the on course position through electromagnetic relay 39 which at the same time controls the speed of motor 27, constitutes a useful improvement in the art.

In order to control the rate of movement of the driving gear 25 depending upon the angular relation of coil antenna 23 to the direction of the radiant energy source, I provide a relay 38 comprising a magnet 39, an armature 40, and a spring 41. Relay 38 is marginal; i. e., spring 41 is so adjusted that when the current through magnet 39 falls below a predetermined fixed value, the armature 40 will be pulled away from the magnet, thereby establishing electrical contact between armature 40 and contact 42. When the current in magnet 39 exceeds a certain fixed value, the armature is pulled toward magnet 39, establishing contact between armature 40 and contact 43. The restoring means applied to relay 8 which consists of yoke 17, arm 18, pivot 19, armature 20, magnet 21, previously referred to, is operated from potential source 44 through rotating contactor 45 driven by motor 46 in such a fashion that the arm 11 of indicator 8 is periodically restored to the central position. The circuit through magnet 21 extends through conductor 76 to interrupter 45 to one side of potential source 44. The opposite side of source 44 connects through conductor 77 to armature 40, the circuit from which is completed through either contact 42 or 43, depending upon the position of the armature. When the armature 40 is attracted by magnet 39 to establish contact with contact 43, the restoring process takes place, that is, during such time as the current in coil 39 exceeds the aforementioned predetermined value. When armature 40 is in contact with contact 43, a circuit to magnet 21 is completed through conductor 78.

I provide means for modulating the radio frequency current in loop 23 by means of a balanced modulator consisting of electron tubes 47 and 48. The cathodes 49 and 50 of these tubes are connected to opposite ends of the secondary of a transformer whose primary is connected to oscillator 51 and the electrical center of whose secndary is connected to ground at 52. The anodes 3 and 54 of tubes 47 and 48 are connected to coupling coil 55 so that the signal from loop 23, which is impressed on grids 56 and 57 of tubes 47 and 48 through coupling condensers 58 and 59, is modulated by the frequency of the oscillator 51 impressed through coupling coil 55 on the input circuit of receiver 3 simultaneously with the signal from the non-directional antenna 1. The combined signals are amplified and demodulated by radio receiver 3 and the resulting alternating current of the frequency of oscillator 51 is impressed on the moving coil 7 of the indicator in the manner set forth in detail in my copending application Serial Number 90,996, filed July 16, 1936, for Radio compass system.

The actuating coils 9 and 10 of the relay 8 are connected to the secondary of the transformer 51a so that magnetic flux is impressed upon the magnetic circuit of relay device 6. It will be seen that there will be present in the output circuit 4 of radio receiver 3 a current whose frequency is that of oscillator 51, the amplitude of which is proportional to the signal picked up by loop 23 and, therefore, proportional to the angle of deviation of loop 23 from the line to the source of radiant energy, and the phase angle of which, with respect to the current in coils 9 and 10, is dependent on the phase angle of the radio frequency current picked up by loop 23 with respect to the radio frequency current picked up by non-directional antenna 1, and whose phase angle with respect to coils 9 and 10 is, therefore, a function of the direction of deviation of loop 23 from the line to the source of radiant energy. It will then be seen that the movable arm 11 connected to coil 7 will move to the left or to the right in accord with movement of loop 23 to the left or to the right of the line to the source of radiant energy.

The magnetic switches 32 and 33 are so connected to motor 27 and source 37 that when the loop 23 rotates to the left and the relay 8 moves also to the left, the motor 27 will be caused to turn the loop to the right. Conversely, if the source of radiant energy in effect moves to the left by deviation of the aircraft from the course, the loop will then turn to the left of the line between the loop and said source. Arm 11 will then move to the left, switch 32 will then close, and the loop will be caused to turn to the right. Because of the magnetic attraction existing between fixed magnetic contacts 15 and 16 and magnetic contacts 12 and 14 fixed to arm 11, it is necessary that the restoring means 17 be actuated intermittently when the magnetic control winding 29 is energized by virtue of the current flow incident upon the impression of signal energy on the balanced amplifier circuit from loop 23.

I have pointed out that the intensity of the signal which actuates relay 6 is proportional to the degree of deviation of the plane of the loop 23 from a line extending in the direction of the source of radiant energy. In order that this signal may not become any greater than that required for the actuation of relay 6, when the deviation of the plane of the loop 23 from the line extending in the direction of the source is great, I have provided means whereby the sensitivity of tubes 47 and 48 may be decreased by the signal in the output circuit 4 if the signal amplitude delivered by the radio receiver 3 exceeds this desired value. Connected to the output circuit 4 of the radio receiver 3 is the anode 70 of rectifier 60. Cathode 61 of the rectifier 60 is maintained by means of potentiometer 62 connected between source 63 of high potential and ground at 64 at a constant positive potential with respect to current which is equal to the peak value of that signal necessary to give the desired deflection of relay 6, so long as the value of that signal which is also impressed on plate 70 of rectifier 60 does not exceed the amount necessary to deflect relay 6. Anode 70 will then be negative at all times with respect to cathode 61, and no current will flow through rectifier 60. Whenever the signal energy impressed on coil 7 exceeds the said predetermined value, the anode 70 will become positive with respect to cathode 61 and current will flow through rectifier 60 from anode 70. Current flowing from ground through resistance 65 to anode 70 thence to cathode 61 through potentiometer 62 back to ground, causes anode 70 to assume a mean potential with respect to ground, thereby charging condenser 66 through resistance 67 negatively with respect to ground. This negative potential is communicated through resistances 68 and 69 to grids 56 and 57 of tubes 47 and 47, thereby decreasing the transconductance directly in proportion to the amount by which the signal impressed on coil 7 exceeds the predetermined positive potential of cathode 61. In this manner, the modulated energy transmitted to radio receiver 3 from loop 23 through coil 55 is limited when its value exceeds that necessary to actuate the relay 6.

It will be understood by those skilled in the art of electron tubes that when the negative charge is impressed on grids 56 and 57 that the anode current of tubes 47 and 48 will be decreased in proportion to the magnitude of the negative charge. It then follows that when loop 23 is at an angle to the line between the loop and the source of radiant energy greater than that necessary to provide adequate actuating means for relay 6, the plate current in tubes 47 and 48 will be decreased proportionately. The anode currents of tubes 47 and 48 flow through magnet 39 and the predetermined value referred to above in connection with the description of relay 38 is that value of the combined plate current of tubes 47 and 48 which is obtained when the loop 23 is on or adjacent to the line of the source of radiant energy. Thus, when the angle of the loop with respect to said line exceeds that value where the signal in coil 7 is adequate to control relay 6, relay 39 will open due to the reduced plate currents in plates 47 and 48 as explained hereinbefore, thereby closing the contact 42 when armature 40 is short-circuiting a part of the field coil 29 of motor 27, causing motor 27 to run at high speed. When the loop 23 is turned by means of gears 25 and 26 as has been explained above, and as the loop approaches the line to the source of radiant energy, the plate current in tubes 47 and 48 will cause the magnet 39 to pull armature 40 with sufficient force to overcome the force of spring 41, thereby establishing a connection between armature 40 and contact 43 which removes the short-circuit from the portion of the field coil 29 and thus causes the motor 27 to run slowly, at the same time completing the circuit through the magnet 21, source 44, interrupter 45. Thus, there is initiated into operation, the mechanical restoring means or yoke 17 which will periodically restore the indicator arm 11 to the center point between fixed contacts 15 and 16 by means of relatively movable arm members 71 until such time as loop 23 shall be in a plane normal to a line drawn to the source of radiant energy, and the signal will disappear in output circuit 4 and the system will come to rest at equilibrium. Thus, I have established that when the loop is near the desired orientation, the speed of its motor will be slow and the interrupting mechanism will function, but when the loop is far from the desired course, the operating motor will operate at high speed and the relay will not be interrupted by the restoring mechanism.

The shaft 24 of the loop 23 carries gear 26 which is driven by the worm 25 on the shaft 80 which is driven by motor 27. The shaft 80 carries a drum 81 against which a brake mechanism 82 is adapted to function. The brake mechanism 82 includes a member 83 which carries a brake shoe 84 which engages drum 81 and which is normally urged in engagement with drum 81 by means of spring 79. The member 83 carries an armature 85 which is magnetically acted upon by electromagnet 86. Electromagnet 86 is connected in series with the armature winding 30 so that when armature winding 30 is energized for revolving shaft 80, electromagnetic winding 86 is similarly energized for moving brake shoe 84 out of engagement with the surface of drum 81 allowing shaft 24 to be revolved by insuring that shaft 24 is brought to an immediate stop as soon as armature winding 30 is deenergized. The shaft 24 extends downwardly beyond gear 26 to the differential gear system 87. The differential gear system 87 includes bevel gear 88 connected with shaft 24, bevel gear 89 connected with shaft 90, and intermediate beveled gears 91 and 92. Intermediate bevel gears 91 and 92 are connected with an indicating pointer 93 operative over a calibrated scale 4. The movement of pointer 93 with respect to scale 94 serves to provide a drift indicator. The drift indicator is provided with a calibrator in accordance with the performance of the aircraft under control of the mechanism which I have provided for controlling the aircraft.

Shaft 90 carries crossarm 95 to the ends of which the control cables 96 connect extending to the steering member 97 of rudder 98. The angular position of rudder 98 is controlled by motor 27 simultaneously with a control of the angular position of loop 23. Loop 23 is maintained in a plane normal to the line of flight so that it is apparent that the direction of flight of the aircraft will be corrected in the event that the aircraft should tend to drift from the predetermined course because of the corrective movement imparted to the rudder 98 through the movement of shaft 90.

Under circumstances where it is necessary to control the rudder from a separate servo-motor, I employ the arrangement illustrated in Fig. 2. The shaft 24 which extends from the radio compass loop 23 carries in insulated relation thereon the contact arm 100. Contact arm 100 is operated through a relatively short angular distance to establish connection with either of two contacts 101 or 102 which are supported in insulated relation by arms 103 and 104 supported on shaft 105. Shaft 105 carries gear 106 which is driven by worm 107 on shaft 108. Shaft 108 is connected with rotary armature 109 of the rudder motor 110. Rudder motor 110 is reversible under control of motor field winding 111 having a center tap connection 112. The source of potential for driving the motor is indicated generally at 113. The direction of current flow through field winding 111 depends upon the contacting of contacts 114 carried by arm 100 either with contacts 101 or 102 depending upon the angular movement of radio compass loop 23. It will be understood that the separation I have shown of contacts 101 and 102 is merely for the purpose of simplifying illustration and that the actual separation employed is adjusted to meet practical conditions. The armature winding on armature 109 is connected in series through electromagnetic winding 99 with the angularly shiftable arm 100 which is adapted to move contact 114 either into connection with contact 101 or 102 for determining the direction of current flow through the field and armature winding for correspondingly determining the direction of movement imparted to shaft 105. It will be seen that arms 103 and 104 so rotate contacts 101 and 102 that these contacts are always in the orbit in which contact 114 revolves. During the periods of time when the reversing operation is being effected or when the rudder must remain stationary, shaft 105 is locked against rotation by the engagement of brake shoe 115 with brake drum 116 on shaft 108. Brake shoe 115 is carried by pivoted member 117 which is normally urged by spring 118 into engagement with the circular periphery of brake drum 116. Member 117 carries armature 119 which is attracted by electromagnetic winding 99 when the motor circuit is energized for withdrawing the brake shoe 115 from the drum 116 and allowing motor 110 to impart movement to shaft 105. Shaft 105 drives shaft 120 through the differential gear system 121. Differential gear system 121 includes bevel gear 122 carried by shaft 105 and bevel gear 123 carried by shaft 120. Intermediate bevel gears 124 and 125 are carried on pointer 126 which operates over calibrated scale 127 to indicate drift of the aircraft from the predetermined course. The shaft of pointer 126 is terminated in a handle member 132 as shown in Figure 1, which handle member can be manipulated for the purposes already set forth. Shaft 120 carries cross-arm 128 which connects through cables 129 with opposite ends of steering arm 130 connected to rudder 131. Rudder 131 is, therefore, controlled from motor 110 in accordance with the angular position of the loop 23 which is maintained through the operation of motor 27 in a plane normal to the course of flight. Accordingly, my invention provides means for maintaining an aircraft in a predetermined course either through control of the radio compass driving motor or through a servo-motor in accordance with my invention as herein described.

I realize that modifications may be made in the construction of the control mechanism and the circuit arrangements employed therewith and, while I have described my invention in certain preferred embodiments, I desire that it be understood that modifications may be made and that no limitations upon my invention are intended other than may be imposed by the scope of the appended claims.

What I claim as new and desire to secure by Letters Patent of the United States, is as follows:

1. A system for controlling aircraft comprising in combination with the rudder of an aircraft, mechanism for controlling the angular movement of said rudder, a radio compass receiver including a coil antenna, means controlled by said radio compass receiver for orienting said coil antenna according to the directive characteristics of the received signaling energy, means controlled by the movement of said coil antenna for controlling the operation of said mechanism, means for operating said mechanism at different speeds depending upon the bearing of the coil antenna with respect to the direction of propagation of the signaling energy and a differential gear system interposed between the means controlled by the movement of the coil antenna and said mechanism.

2. A system for controlling aircraft comprising in combination with the rudder of an aircraft, mechanism for controlling the angular movement of said rudder, a radio compass receiver including a coil antenna, means controlled by said radio compass receiver for orienting said coil antenna according to the directive characteristics of the received signaling energy, means controlled by the movement of said coil antenna for controlling the operation of said mechanism, means for operating said mechanism at two different speeds depending upon the bearing of said coil antenna with respect to the direction of propagation of the signaling energy and a drift indicator interposed between said means controlled by the movement of said coil antenna and said mechanism.

3. A system for controlling aircraft comprising in combination with the rudder of an aircraft, mechanism for controlling the angular movement of said rudder, a radio compass receiver connected therewith, a coil antenna, a local oscillator whose output is controlled according to the bearing of said coil antenna with respect to the transmitter, means for orienting said coil antenna, means for controlling the aforementioned means by the output of said local oscillator according to the directive characteristics of the received signaling energy, means controlled by the movement of said coil antenna for controlling the operation of said mechanism, means for operating said mechanism at a greater velocity when the aircraft is substantially off-course with respect to the direction of propagation of the signaling energy than when the aircraft is more nearly on-course with respect to the direction of propagation of the signaling energy, and a drift indicator interposed between said first mentioned means and said mechanism.

4. A system for controlling aircraft comprising in combination with the rudder of an aircraft, mechanism for controlling the angular movement of said rudder, a radio compass receiver including a coil antenna, drive means controlled by said receiver for orienting said coil antenna according to the directive characteristics of the received signaling energy, means for imparting movement from said drive means to said mechanism, means for modifying the rate of operation of said drive means according to the bearing of said coil antenna with respect to the direction of the directively propagated signaling energy, and a differential drift indicator interposed between said mechanism and said drive means.

5. A system for controlling aircraft comprising in combination with the rudder of an aircraft, mechanism for controlling the angular movement of said rudder, a radio compass receiver including a coil antenna, drive means controlled by said receiver for orienting said coil antenna according to the directive characteristics of the received signaling energy, means for imparting movement from said drive means to said mechanism, means for angularly moving said drive means at different speeds depending upon the bearing of the coil antenna with respect to the direction of propagation of the signaling energy, and a drift indicator disposed between said mechanism and said drive means.

6. A system for controlling aircraft comprising in combination with the rudder of an aircraft, mechanism for controlling the angular movement of said rudder, a radio compass receiver connected with a coil antenna, an oscillator, means for controlling the amplitude output of said oscillator according to the amplitude of the signal energy incident upon said coil antenna, means controlled by the combined output of said local oscillator and the output of said radio compass receiver for orienting said coil antenna according to the directive characteristics of the received signaling energy, a current limiting circuit connected with said local oscillator for limiting the effect of said oscillator upon said aforementioned means, means controlled by the movement of said coil antenna for controlling the operation of said mechanism, means for regulating the rate at which said mechanism is controlled depending upon the bearing of the coil antenna with respect to the direction of propagation of the signaling energy, and means for restraining the displacement of said rudder so long as said coil antenna maintains a predetermined relation to the direction of the directively propagated signaling energy.

7. A system for the automatic steering of aircraft comprising a radio receiver, a directional antenna associated therewith, a non-directional antenna in circuit with said receiver, means for modulating the signals of said directional antenna, a course indicating means connected to the output of said receiver, rudder control means, including an electric motor in circuit with said indicating device, means responsive to off-course indications for causing said motor to operate, means for rotating said directional antenna, said rudder control means being operative upon movement of said directional antenna from a predetermined relation with respect to a transmitting station and means responsive to a change in output of said modulating means for changing the speed of rotation of said directional antenna.

FREDERICK J. HOOVEN.